Figure 1:
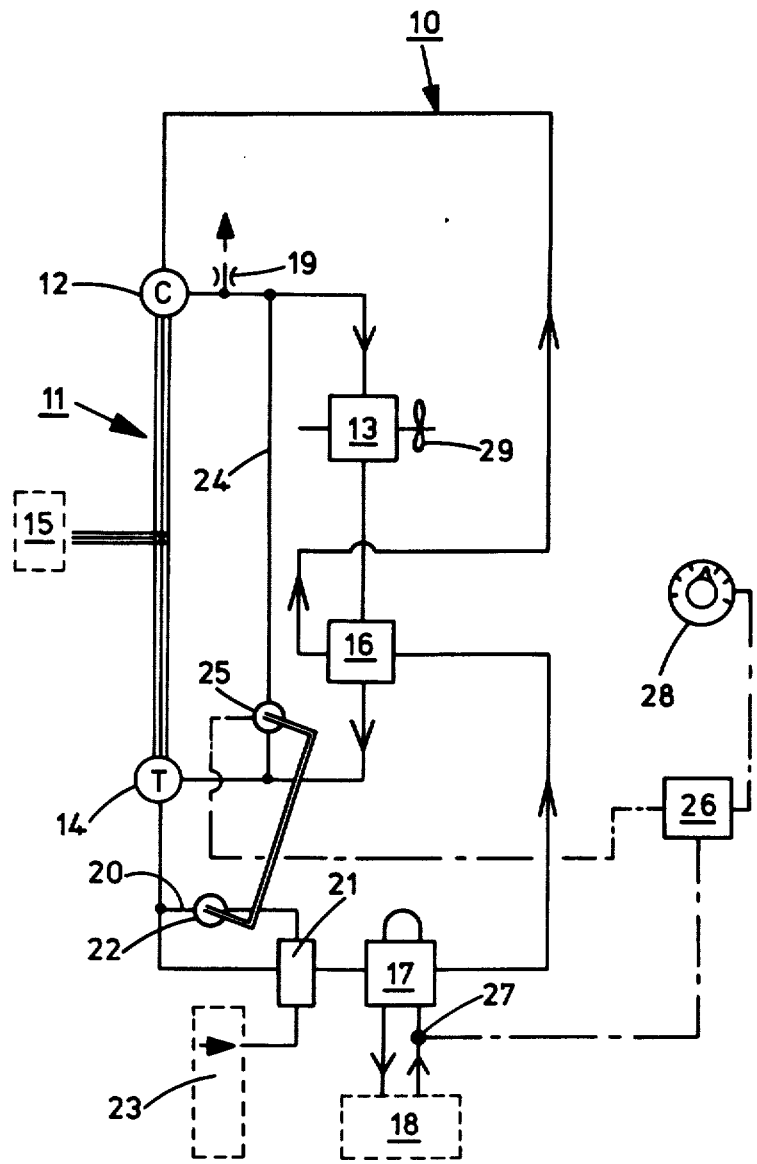

United States Patent [19]

Rogers et al.

[11] 4,185,469
[45] Jan. 29, 1980

[54] ENVIRONMENTAL CONTROL SYSTEMS

[75] Inventors: Brian H. Rogers; Robin H. Thring, both of Yeovil, England

[73] Assignee: Normalair-Garrett (Holdings) Limited, Yeovil, England

[21] Appl. No.: 820,294

[22] Filed: Jul. 29, 1977

[30] Foreign Application Priority Data

Aug. 6, 1976 [GB] United Kingdom ............... 32965/76

[51] Int. Cl.² ............................................. F25B 45/00
[52] U.S. Cl. ....................................... 62/174; 62/172; 62/196 B
[58] Field of Search ............... 62/149, 172, 174, 402, 62/87, 77, 324 B, 196 B; 165/62

[56] References Cited

U.S. PATENT DOCUMENTS

| | | | |
|---|---|---|---|
| 2,715,317 | 8/1955 | Rhodes | 62/149 |
| 3,813,893 | 6/1974 | Gemender et al. | 62/149 |
| 3,933,004 | 1/1976 | Derrick et al. | 62/196 B |
| 3,967,466 | 7/1976 | Edwards | 62/402 |

FOREIGN PATENT DOCUMENTS 487026 6/1938 United Kingdom ............... 62/149

Primary Examiner—William E. Wayner
Attorney, Agent, or Firm—Larson, Taylor and Hinds

[57] ABSTRACT

An environmental control system comprises a working gas circuit including a compressor-expander arrangement and first heat exchange means by which the working gas is conditioned before being passed to second heat exchange means connected in the circuit in heat exchange relationship with an environment to be controlled. The working gas is provided with means for regulating the mass of working gas in the circuit in response to the conditioning demand on the system. One such regulating means comprises an inlet path for admitting working gas to the circuit and an outlet path for removing working gas from the circuit.

12 Claims, 3 Drawing Figures

ENVIRONMENTAL CONTROL SYSTEMS

This invention relates to environmental control systems.

There are two types of conditioning systems in general use at the present time, namely the vapour cycle type and the air cycle type. Hitherto the working gas in the air cycle type of such systems has been air that is supplied in a conditioned state to an enclosure and then wasted.

In one such air cycle system the air is bled from a compressor stage of a propulsive gas turbine, or provided by an auxiliary power unit, and passed through a heat exchanger before entering the compressor of a turbo-compressor arrangement. If desired it is then passed through another heat exchanger before being expanded across an air expansion turbine from which it is delivered to a subject compartment, whereafter at least a substantial portion of the air is wasted to ambient.

This usage of air can no longer be tolerated in the majority of instances where it is bled from propulsion units, as for example in the aircraft field, where various demands are being made on the engine designer such that he can no longer accommodate the requirements for bleed air which are increasing with the introduction of more electronic equipment that needs cooling.

When environmental control systems are being considered, the vapour cycle type of system may be proposed as an alternative that requires no pressurized air. However, although this system has an efficient performance, it has disadvantages of weight and a higher maintenance requirement, as well as the problems of logistics in making the refrigerant widely available, and vulnerability to damage in military applications.

It is an object of the present invention to provide an environmental control system that combines the advantages of light weight and simplicity inherent in conventional air cycle systems with the advantages of low power consumption of vapour cycle systems.

It is another object of the invention to provide an environmental control system having means for controlling the system which vary the power consumption of the system appropriately to varying system parameters such as cooling or heating demand, speed of a power input shaft, and temperature of the heat sink.

It is a further object of the invention to provide an off-the-shelf environmental control system that can be adopted for use in a wide range of applications having varying conditioning demands, without a requirement for major components in the system to be changed in order to meet the demand of any particular application.

Accordingly, one aspect of the invention provides an environmental control system comprising a working gas circuit including a compressor-expander arrangement having a compressor for compressing working gas in the circuit and passing it by way of a first heat exchange means that extracts heat from the working gas to a gas expander connected on its downstream side to pass the working gas to a second heat exchange means arranged to exchange heat with an environment to be controlled, and thence to the inlet of the compressor, and means for controlling the pressure and density of the working gas in accordance with the conditioning demand that, during any phase of operation, is being made on the system.

In one embodiment of the invention control of the pressure and density of the working gas in the circuit may be effected by providing an inlet path for admitting working gas to the circuit and an outlet path for removing working gas from the circuit.

Therefore, another aspect of the invention provides an environmental control system comprising a working gas circuit with an inlet path for admitting working gas to the circuit and an outlet path for removing working gas from the circuit, a compressor-expander arrangement including a compressor for compressing working gas in said circuit and an expander to expand the compressed working gas, first heat exchange means connected in said circuit to receive compressed working gas for heat exchange with a coolant and to discharge said gas to said expander, second heat exchange means connected in said circuit to receive expanded working gas from said expander and to discharge said gas to the compressor and being in heat exchange relationship with the environment to be controlled, and means responsive to the heat flow demand on the system for regulating the mass of working gas in said circuit.

The term 'conditioning' as used herein means thermal conditioning, that is to say the addition of heat to or the extraction of heat from a conditioned environment.

A suitable working gas is one that does not change state, i.e. liquefy, in following the circuit. Thus, whilst air is a preferred working gas, other gases and gas mixtures may also be suitable, such as, for example, helium or a helium-oxygen mixture.

The objects of the invention are achieved by arranging for the working gas in the circuit to be supercharged, whereby density is increased and hence the flow capacity and consequently the conditioning capacity, whilst the pressure of the supercharged gas is automatically variable in a manner appropriate to the conditioning demand, so that the power source driving the compressor-expander arrangement is required only to provide power appropriate to that demand. The term 'conditioning demand' is also known as the 'load on the system' or more simply as 'the load.'

A system employing the invention has great versatility since any one system can be arranged to accommodate a wide range of different conditioning demands, so obviating the need for a system to be specially designed for each application.

The outlet path for removing working gas from the circuit may be at any suitable position in the circuit, one preferred position being between the compressor outlet and the first heat exchange means, or alternatively it may be by way of a predetermined leak-path passing behind a rotary seal of the compressor-expander assembly.

The inlet path for admitting gas to the circuit may be arranged for connection to a bleed from a stage of an engine compressor, or from pump means, and may enter the circuit at any suitable position, one preferred position being immediately downstream of the expander.

The pressure control means may be arranged to control the flow through either the inlet path only or both the inlet and outlet paths in order to regulate the mass of gas in the circuit and hence the pressure therein appropriate to the conditioning demand at the second heat exchanger.

Coolant flow to the first heat exchanger may be any convenient form of heat sink from any convenient source. Preferable forms are air or fuel, of which the source of air is ambient being obtained as ram air or by fan means.

A fan passing coolant air through the first heat exchange means may form part of an assembly that includes a compressor-expander, and conveniently the latter may comprize a compressor-air expansion turbine type air cycle machine. The assembly may be arranged as a 'three wheel turbine' in which the fan, compressor wheel and turbine wheel are mounted on a common shaft, or interconnected shafts. Also the machine could drive a pump for supplying pressurized air to the circuit.

The heat transfer medium between the subject to be conditioned and the second heat exchanger may be any convenient fluid.

It may be found appropriate in some systems according to the invention to include a third heat exhange means, disposed in the circuit between the first heat exchange means and the expander. Preferably, the third heat exchange means is of the regenerative type receiving its coolant flow from downstream of the second heat exchange means.

Control of temperature may be provided by incorporating a by-pass conduit in the circuit that circumvents the first and regenerative heat exchangers. A temperature control valve which may also be operably associated with the pressure control means is positioned in the by-pass conduit.

It may also be found appropriate to include means for removing moisture from pressurized air that is admitted to the circuit as the working gas by way of the inlet path, a preferred means comprising a condenser inserted in the inlet path and arranged to be in heat exchange relationship with the air circulating within the circuit. The condenser may conveniently be formed as an integral part of the second heat exchange means.

Figure 2:
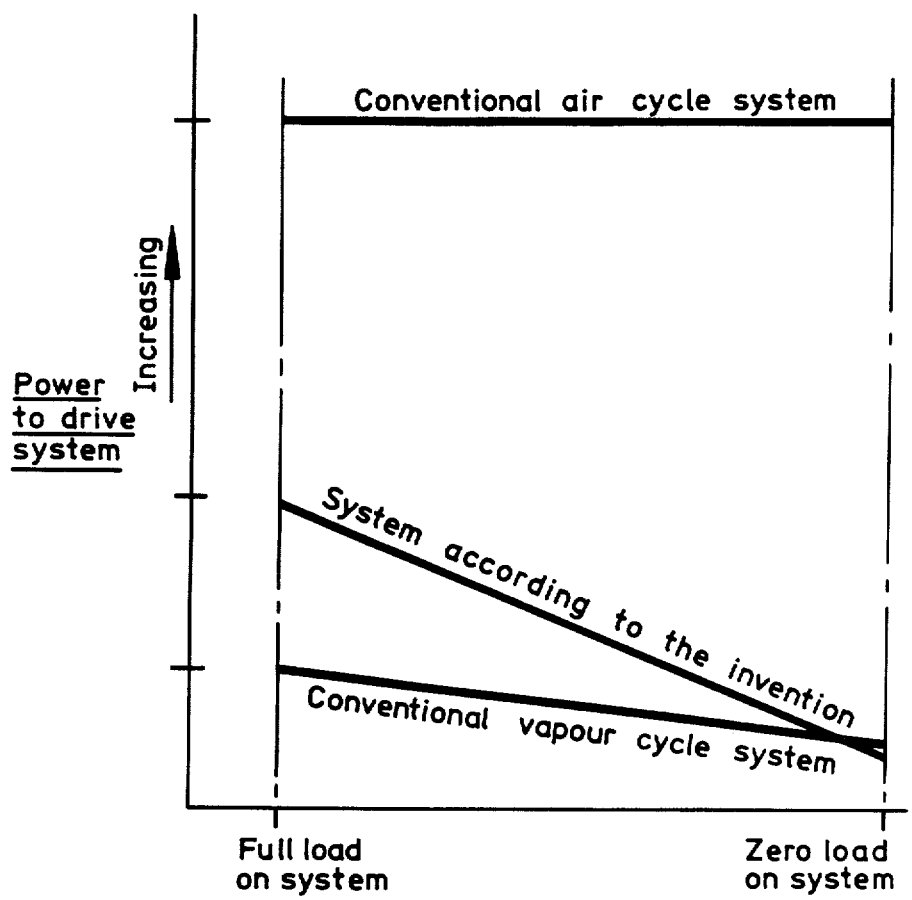
Figure 3:
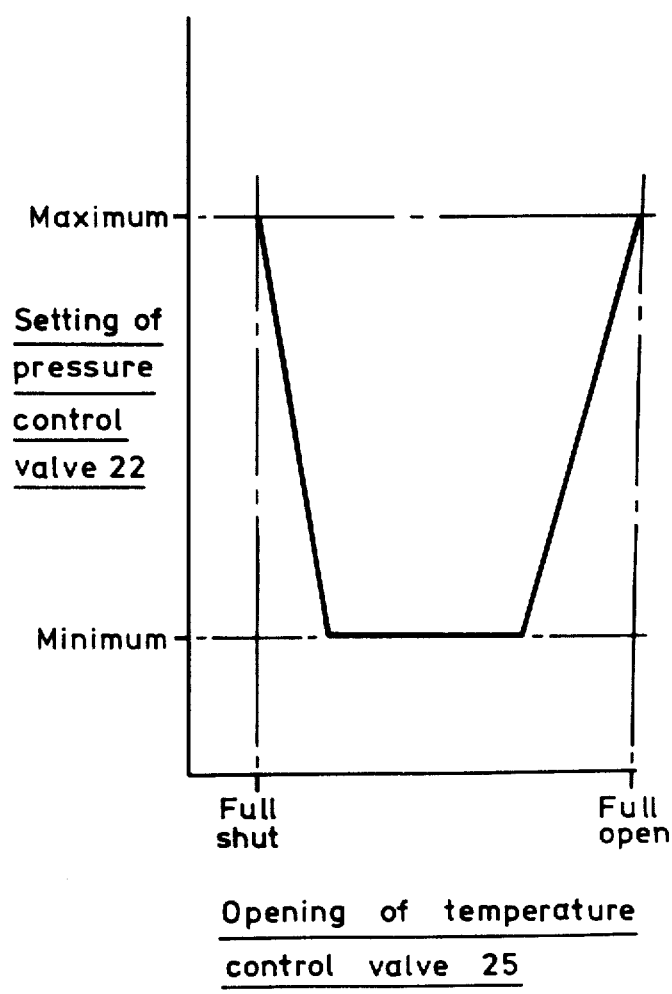

The invention will be more readily understood from the following description of an exemplary embodiment with reference to the accompanying drawings, in which:

FIG. 1 is a diagrammatic representation of an environmental control system according to one embodiment of the invention, FIG. 2 is a graphical representation showing the relative power requirements of two conventional conditioning systems and a system according to the invention, and FIG. 3 is a graphical representation showing system control characteristics.

An environmental control system, shown in FIG. 1, comprizes a substantially closed conduit circuit 10 including a bootstrap arrangement 11, comprising a compressor 12 arranged to deliver a working gas, in this case air, to a first heat exchanger 13 and thence to an expansion turbine 14, in known manner, the compressor 12 and turbine 14 being provided by a single machine having its compressor and turbine wheels mounted on a common shaft. The machine is operably connected to any suitable power source 15, such as an aircraft's accessories power take-off, auxiliary unit or other motor, which does not form part of the present invention. A regenerative heat exchanger 16 is interposed in the bootstrap arrangement between the first heat exchanger 13 and the turbine 14, being arranged to receive its primary flow from the compressor 12 by way of the first heat exchanger 13 and its secondary flow from the turbine 14 by way of a second heat exchanger 17 that is arranged to exchange heat with an environment 18 that is to be controlled. The secondary flow outlet of the regenerative heat exchanger 16 is conduitly connected to the inlet of the compressor 12 to complete the substantially closed conduit circuit 10.

An outlet path for removing air from the circuit comprises a fixed orifice bleed 19 of predetermined area provided in the conduit circuit 10 between the outlet of the compressor 12 and the inlet of the heat exchanger 13, whilst an inlet path for admitting air to the circuit comprizes an inlet duct 20 incorporating a condenser 21 and a pressure control valve 22. The inlet duct 20 is connected with some convenient source of air pressure 23, such as a suitable compressor stage of an engine or pump. A by-pass conduit 24 circumvents the first and regenerative heat exchangers 13, 16, respectively, and includes a valve 25, the actuator of which is mechanically connected to the valve 22 and electrically connected to a temperature controller 26. A temperature sensor 27 is positioned to sense the return from the environment 18 and is connected to a comparator circuit in the temperature power controller 26. The comparator circuit is also connected with a selector 28.

The entry for secondary flow to the heat exchanger 13 is provided with a fan 29 driven by any suitable means.

In operation of the system, the air cycle machine comprizing the compressor 12 and the turbine 14 is driven by the power source 15. This circulates the air in a supercharged condition which, at normal cooling demand conditions, produces, say, a pressure of 40 p.s.i.a. at the inlet of the compressor 12, becoming elevated to 70 p.s.i.a. at the compressor outlet, with corresponding temperatures of, say, 48° C. and 120° C. This latter temperature is then reduced in three stages, namely in the heat exchanger 13 by ambient air at 40° C.-50° C., the regenerative heat exchanger 16 by downstream flow in the circuit 10 at, say, 22° C., and lastly in expanding across the turbine 14 from which it discharges at 0° C. A rise in temperature of the supercharged airflow from 0° C. to 22° C. occurs in abstracting heat from the fluid recirculating through the heat exchanger 17 from the environment 18. Typically, the fluid may enter the heat exchanger 17 at 40° C. and be reduced by 25° C. on leaving. The mass flow rate of the airflow in the system 10 is, say, 40 lb./min.

The fixed orifice bleed 19 passes an outflow of, say, ¼ lb./min., and this is matched, during the normal cooling demand at the heat exchanger 17, by a pressurized inflow at 40 p.s.i.a. through the inlet 20. The inflow air from the compressor stage of the engine 23 is dried in passing through the condenser 21 by the effects of the cold air delivered from the turbine 14, the condensate being conveniently drained away.

Control of the system is achieved by setting a desired subject temperature condition on the selector 28, which setting is compared by means of the comparator circuit in the temperature controller 26 with the feed-in from the temperature sensor 27. The output from the comparator circuit is suitably amplified and fed to the actuator of the temperature control valve 25.

The mechanical linkage between the actuator of temperature control valve 25 and the pressure control valve 22 is suitably arranged by cam means (not shown) to follow the characteristic shown on FIG. 3. FIG. 3 shows that when either full cooling or full heating is required, the circuit pressure and hence flow-rate are a maximum, whilst at condition of low or zero conditioning demand, i.e. at intermediate temperature control valve positions, the circuit pressure and hence flow-rate and power comsumption are minimal.

The characteristic of the mechanical linkage of the temperature control valve 25 and the pressure control valve 22 is arranged by the cam means (not shown) in a manner so that as the temperature control valve 25 progressively opens from the closed position the setting of the pressure control valve 22 is initially lowered to reduce cooling and then raised again in order to provide positive heating.

Thus, as the conditioning demand at the heat exchanger 17 increases or decreases from the normal, the pressure and hence density is varied correspondingly, whereby with changing demand the mass flow of air passing around the circuit is also changed correspondingly and consequently the power absorbed by the air cycle machine is close to the minimum required to satisfy the pertaining cooling demand. Complete closure of the inlet air control valve 22 causes the pressure at the outlet of the compressor 12 to fall to substantially that corresponding to ambient pressure which, in this example is, say, only one fifth of the design point value, i.e. 20% of the pressure required to accommodate the predetermined maximum conditioning demand at the heat exchanger 17. Thus, assuming a constant compressor speed, the cooling demand can range anywhere within that maximum and one fifth thereof, with the power consumption varying accordingly.

It will be seen with reference to FIG. 2 that whilst the power consumption at full load of a system in accordance with the present invention falls somewhere between the power consumptions of a conventional air cycle system and a conventional vapour cycle system, at zero loads the power consumed by the system of the present invention drops to a level corresponding to, or slightly below, the power consumption of a conventional vapour cycle system at zero load. At the same time a system in accordance with the present invention avoids many of the disadvantages of the conventional vapour cycle system.

Of course, the embodiment of the invention as hereinbefore described with reference to and as shown in FIG. 1 of the accompanying drawings is by way of example only, so that modifications are possible without departing from the scope of the invention. For instance, whilst we have particularly described hereinbefore means according to the invention that enable power consumption to be varied according to system load, the control of system performance that the invention provides can also be utilized to compensate for variation in speed of the shaft drive, or variations in the temperature of the coolant supply to the first heat exchanger. For example, if the system is sized to provide a requisite cooling capacity at the minimum shaft speed, the increase in power consumption due to higher shaft speed can be minimized by reduction of the density of the circulating air in the manner of the exemplary embodiment. Similarly if the temperature of the coolant air to the first heat exchanger falls the resultant increase in system cooling capacity can be compensated by reduction of the density of the air in the circuit.

It will be appreciated that control of system temperature could equally well be achieved by controlling the coolant airflow passing through the first heat exchanger by means of a temperature control valve placed in the coolant line. This method is particularly applicable in the case where no regenerative heat exchanger is fitted. As in the exemplary embodiment, the pressure control valve is linked to the temperature control valve.

It will be further appreciated that in a completely sealed system, using a suitable gas or gaseous mixture, the outlet path and the inlet path may be interconnected by way of a reservoir and pump means, with the pump means, preferably, being operated from the shaft of the compressor-expander arrangement.

The condenser may be conveniently integrated with the load heat exchanger at its upstream end, if desired. The condenser may also be substituted by any form of air drier.

It will be understood that the term 'expander' includes all suitable devices in which gas expands and cools in passing a rotary member of the device.

Whilst we have described and illustrated an automatic system it will be appreciated that the scope of the invention includes a manual system, where the pressure control valve and the temperature control valve are manually adjustable.

Also, a mechanical link between the temperature control valve and the pressure control valve has been described. This link could also be achieved by other means, e.g. hydraulic, electric or pneumatic.

The pressure control valve could also be operated automatically by a control system which is independent of the temperature control system.

In applications where the range of conditioning demand allows, it is possible to omit the regenerative heat exchanger.

We claim as our invention:

1. An environmental control system comprising a working gas circuit with an inlet path for admitting working gas to the circuit and an outlet path for removing working gas from the circuit; a compressor-expander arrangement including a compressor for compressing working gas in said circuit and an expander to expand the compressed working gas; first heat exchange means connected in said circuit to receive compressed working gas for heat exchange with a coolant and to discharge said gas to said expander; second heat exchange means connected in said circuit to receive expanded working gas from said expander and to discharge said gas to the compressor and being in heat exchange relationship with the environment to be controlled; means for regulating the mass of the working gas in said circuit; and means for controlling the temperature of the working gas, said mass regulating means and said temperature regulating means being responsive to thermal demands on the system.

2. An environmental control system as claimed in claim 1 wherein said mass regulating means and said temperature control means are operably connected to one another such that one is driven by the other.

3. An environmental control system as claimed in claim 2 wherein said temperature control means comprises a by-pass conduit arranged to circumvent said first heat exchange means and a temperature control valve positioned in said by-pass conduit, said temperature control valve and said mass regulating means being responsive to the temperature of the controlled environment.

4. An environmental control system as claimed in claim 3 wherein said outlet path comprises an orifice having predetermined flow characteristics so as to constantly bleed the working gas from said working gas circuit and wherein said mass regulating means is a valve in said inlet path which controls the amount of working gas admitted to said working gas circuit.

5. An environmental control system as claimed in claim 3 wherein said connecting means controls said mass regulating means and said temperature control valve to provide maximum working gas pressure at the lowest and highest working temperature of said working gas and a minimum working gas pressure at a point between said lowest and highest temperatures.

6. An environmental control system as claimed in claim 1, wherein the outlet path for removing working gas from the circuit comprizes a constant bleed orifice having predetermined flow characteristics.

7. An environmental control system as claimed in claim 6, wherein the orifice is positioned in the circuit between an outlet from the compressor and an inlet to the expander.

8. An environmental control system comprising a working gas circuit with an inlet path for admitting working gas to the circuit and an outlet path for removing working gas from the circuit; a compressor-expander arrangement including a compressor for compressing working gas in said circuit and an expander to expand the compressed working gas; first heat exchange means connected in said circuit to receive compressed working gas for heat exchange with a coolant and to discharge said gas to said expander second heat exchange means connected in said circuit to receive expanded working gas from said expander and to discharge said gas to the compressor and being in heat exchange relationship with the environment to be controlled; means responsive to the heat flow demand on the system for regulating the mass of working gas in said circuit; and a bypass conduit connected on the upstream side of said first heat exchange means and on the upstream side of said second heat exchange means, and a temperature control valve positioned in said by-pass conduit.

9. An environmental control system as claimed in claim 8, wherein the working gas circuit includes a regenerative heat exchange means disposed between the outlet of the first heat exchange means and the expander inlet and arranged to receive a coolant flow from downstream of the second heat exchange means, the working gas circuit further including a by-pass conduit arranged to circumvent the said first heat exchange means and said regenerative heat exchange means by connecting the working gas circuit between the downstream side of said outlet path and the inlet to said expander, and a temperature control valve positioned in the by-pass conduit.

10. An environmental control system as claimed in claim 9, wherein the mass regulating means is operably connected to the temperature control valve.

11. An environmental control system as claimed in claim 8, wherein said inlet path includes heat exchange means arranged in heat exchange relationship with the working gas circuit on the upstream side of the second heat exchange means.

12. An environmental control system as claimed in claim 8 wherein said mass regulating means and said temperature control means are operably connected to one another such that one is driven by the other.

* * * * *